United States Patent [19]

Satake et al.

[11] Patent Number: 5,234,797

[45] Date of Patent: Aug. 10, 1993

[54] OPTICAL RECORDING MEDIUM

[75] Inventors: Toshimi Satake; Tomoaki Nagai; Hiroshi Fukui; Miyuki Yokoyama; Akio Sekine, all of Tokyo, Japan

[73] Assignee: Jujo Paper Co., Ltd., Tokyo, Japan

[21] Appl. No.: 483,028

[22] Filed: Feb. 20, 1990

[30] Foreign Application Priority Data

Feb. 20, 1989 [JP] Japan .................................. 1-39829

[51] Int. Cl.$^5$ .............................................. G03C 1/73
[52] U.S. Cl. .................................. 430/338; 430/336; 430/340; 430/348; 430/944; 430/945
[58] Field of Search ............... 430/944, 945, 330, 348, 430/340, 336, 338; 252/587, 589, 600; 350/1.1

[56] References Cited

U.S. PATENT DOCUMENTS

| | | | |
|---|---|---|---|
| 3,219,818 | 11/1965 | Luebbe, Jr. | 430/348 |
| 3,619,157 | 11/1971 | Brinckman | 430/348 |
| 3,628,953 | 12/1971 | Brinckman | 430/944 |
| 3,679,410 | 7/1972 | Vrancken | 430/348 |
| 3,793,025 | 2/1974 | Vrancken et al. | 430/348 |
| 4,259,424 | 3/1981 | Endo et al. | 430/348 |
| 4,788,128 | 11/1988 | Barlow | 430/944 |
| 4,816,386 | 3/1989 | Gotoh et al. | 430/944 |
| 4,933,269 | 6/1990 | Parton et al. | 430/944 |
| 5,061,536 | 10/1991 | Satake et al. | 428/64 |
| 5,075,146 | 12/1991 | Satake et al. | 428/64 |

FOREIGN PATENT DOCUMENTS

| | | |
|---|---|---|
| 54-4142 | 1/1979 | Japan . |
| 0182483 | 11/1982 | Japan ..................... 430/348 |
| 0189888 | 11/1982 | Japan . |
| 58-94494 | 6/1983 | Japan . |
| 58-209594 | 12/1983 | Japan . |
| 63-272702 | 11/1988 | Japan . |
| 2112160 | 7/1983 | United Kingdom . |
| 2198855 | 6/1988 | United Kingdom . |
| 2200220 | 7/1988 | United Kingdom . |

OTHER PUBLICATIONS

Patent Abstracts of Japan, vol. 7, No. 193, Aug. 24, 1983.
Patent Abstracts of Japan, vol. 6, No. 1, Jan. 7, 1982.
Chemical Industry, vol. 37, No. 5, 1986.

*Primary Examiner*—Charles L. Bowers, Jr.
*Assistant Examiner*—Thorl Chea
*Attorney, Agent, or Firm*—Cushman, Darby & Cushman

[57] ABSTRACT

In an optical recording medium, a light absorbent can be incorporated into a color-developing layer without separately constituting a light absorbing layer by holding the light absorbent in a dispersed or dissolved state in a solvent soluble or heat fusible material. Thus, an optical recording medium which exhibits satisfactory image density with a small amount of the light absorbent can be provided.

9 Claims, 1 Drawing Sheet

OPTICAL RECORDING MEDIUM

BACKGROUND OF THE INVENTION

1. Field of the Invention

The present invention relates to a recording medium which uses a light as a recording source and performs visually readable recording by utilizing a material capable of emitting heat after thermal conversion of the absorbed light.

2. Description of the Prior Art

In a direct recording system which does not require development and fixing steps, heat-sensitive recording papers which use basic dyes and organic developers as couplers are excellent in operation and maintenance. Thus, the heat-sensitive recording papers are widely used for facsimiles and printers.

In this system, however, hot recording is conducted by bringing a thermal head or an exothermic IC pen into direct contact with a heat-sensitive recording paper. Consequently, colored substances in a fused state adhere to the thermal head or the exothermic IC pen, cause troubles such as dregs adhesion and sticking, and lead to problems of record obstruction and impairment of record quality.

In particular, when a line is continuously drawn in a recording direction as in the case of a plotter printer, it has been impossible to carry out continuous printing without trouble of dregs adhesion.

Further, in the recording system using the thermal head, it has been considered difficult to heighten an image resolution to 8 dotts/mm or more.

Consequently, non-contact recording systems using light have been proposed as techniques for eliminating the troubles of dregs adhesion and sticking and further improving image resolution.

Japanese Patent Laid-Open Publication No. 4142/1979 discloses a heat-sensitive recording medium prepared by coating a substrate with a heat-sensitive recording layer essentially consisting of a leuco dye, which comprises using a metallic compound having a lattice defect. The metallic compound absorbs beams in visible and infrared regions, performs thermal conversion and enables heat-sensitive recording.

Japanese Patent Laid-Open Publication No. 209594/1983 discloses an optical recording medium prepared by lamianting on a substrate at least one set of layer consisting of a near infrared absorbent layer having an absorption wave length in a near infrared region of 0.8 to 2 μm and a heat-sensitive color-developing material layer. Japanese Patent Laid-Open publication No. 94494/1983 describes a recording medium obtained by coating a substrate with one or more of heat-sensitive color-developing materials and one or more of near infrared absorbents composed of compounds having a maximum absorption wave length in near infrared region of 0.7 to 3 μm. It is disclosed that recording on these recording media can be carried out by use of a hot plate or laser beams having a wave length in the vicinity of near infrared region.

Japanese Patent Laid-Open Publication Nos. 94494/1983 and 209594/1983 describe a method for obtaining a light-absorbing heat-sensitive color-developing layer by applying and drying a coating compound prepared by direct addition of a near infrared absorbent to a heat-sensitive color-developing material. These methods, however, exert desensitizing effect or coloring effect on the heat-sensitive color-developing material. Most of these methods impair color development and the ground color, and hence it is difficult and impractical to select the near infrared absorbing material capable of being used. As a countermeasure to the problem, a method has been proposed to alternately laminate a layer containing the near infrared absorbent and another layer containing the heat-sensitive color-developing material. However, increase in number of lamination is disadvantageous in view of production.

The near infrared absorbents disclosed in these publications are cyanine dyes, thiol nickel complexes and squalium dyes. Other near infrared absorbents which have been known are nitroso compounds and metal complexes thereof, polymethine dyestuffs (cyanine dyestuffs), cobalt or palladium complexes of thiol, phthalocyanine dyestuffs, triallyl methane dyestuffs, immonium or diimmonium dyestuffs and naphthoquinone dyestuffs. These near infrared absorbents are described in the paper entitled "Near Infrared Absorption Dyestuffs" [Chemical Industry (Japan), 43, May 1986].

Any of the above conventional near infrared absorbents are remarkably colored and provides poor ground color for the optical recording medium containing the near infrared absorbents as such. In addition, when these near infrared absorbents are directly contained in the heat-sensitive color-developing materials, any of these absorbents exhibit desensitizing action and hence color density is insufficient.

When the optical recording medium is photodiscs, reading is mechanically made and hence an enough optical contrast obtained in a reading wave length serves to carry out reading. However, a readable contrast between image density and ground color is required for the direct reading of recorded information with naked eyes of human. The above methods which have been known for using the near infrared absorbents cannot provide sufficient contrast.

SUMMARY OF THE INVENTION

The principal object of the present invention is to provide an optical recording medium having a high image density, good ground color and a sufficient contrast for direct reading with naked human eyes by utilizing a light absorbent capable of absorbing light other than visible region, a low output laser beam having a dominant wave length in the vicinity of near infrared rays in particular, thereby emitting heat, and a material capable of developing color by heat.

The present invention can achieve the above object by mounting on a substrate a light absorbent which is dispersed or dissolved in a solvent soluble or heat fusible material and a material which thermally develops color by itself or by reaction with other substances.

According to the present invention, an optical recording medium which comprises a near infrared absorbent in a heat fusible material can be provided. The heat fusible material being capable, in a heat-fused state, of dissolving an electron donating colorless dye which thermally develops color and an electron accepting acid material in a heat-sensitive color-developing layer containing said electron donating colorless dye and said electron accepting acid material, and the heat fusible material having a lower melting point than said electron donating colorless dye and/or said electron accepting acid material.

DETAILED DESCRIPTION OF THE INVENTION

Figure 1:
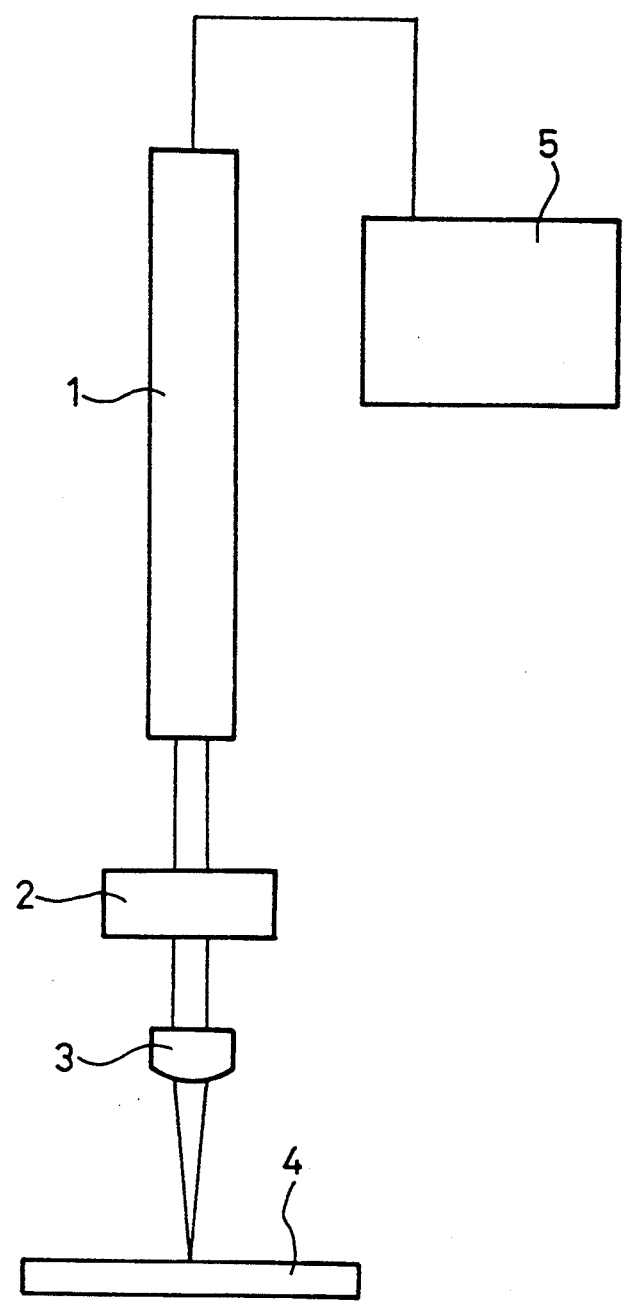
FIG. 1 illustrates a block diagram of a laser optical recording device for use in developing an optical printing by irradiating laser beams on an optical recording medium.

The light absorbent which is a component of the optical recording medium of this invention is a material for absorbing light from the recording source, converting the absorbed light to heat and emitting the heat out of the material. Preferred light absorbent can absorb a broad range of light from the recording source as much as possible and convert into heat. The maximum absorption wave length of the light absorbent is favorably coinsided with or approximated by the dominant wave length of the recording beams in views of heat conversion efficiency and evolved quantity of heat. In order to obtain a record suitable for reading with naked eyes, the maximum wave length of the light absorbent and the dominant wave length of the recording beams is preferably outside of the visible region. The light absorbent having the maximum absorption wave length in the visible region has a characteristic hue and strongly colored. Consequently, such light absorbent can only be used for specific applications.

No particular limitation is imposed upon the light source for recording. It is, however, preferred that a small sized and simple device can develop sufficient intensity of light beams and the light absorbent can evolve enough quantity of heat to develop full coloration of the thermally color-developing material. It is also preferred that the light beams can be readily condensed and the light beam is safe. In consideration of these points, the best light source at present is a laser beam having a dominant wave length in the near infrared region.

Most of near infrared absorbents correspond to the material having a dominant wave length in the near infrared region and absorbing light beams to carry out thermal conversion. The near infrared absorbent may have a characteristic absorption in the near infrared region of 0.7 to 3 m $\mu$ and has been disclosed in Japanese Patent Laid-Open Publication Nos. 4142/1979, 209594/1983 and 94494/1983.

Exemplary absorbents which have been conventionally known include cyanine dyes, nickel complexes of thiol, squalium dyes; nitroso compounds and their metal complexes, polymethine dyes (cyanine dyes), cobalt or palladium complexes of thiol, phthalocyanine dyes, triallyl methane dyes, immonium or diimmonium dyestuffs and naphthoquinone dyestuffs, i.e., dyestuffs reported in the paper entitled "Near Infrared Absorption Dyestuffs", Chemical Industry (Japan), 43, May 1986; products obtained by mixing and heating treatment of thiourea derivatives such as 1,3-diphenylthiourea and 1,3-dibenzylthiourea with organic acid salts, alcoholates or hydroxides of metals having an atomic weight of 40 or more except metals in the groups Ia and IIa of the periodic table, i.e., compounds which have been found by the present inventors; and dispersible near infrared absorbents such as copper sulfide and graphite which are related to optical recording medium using dispersible near infrared absorbents.

The material which is another component of the optical recording medium of this invention and thermally develops color by itself or by reaction with other substances is, for example, the electron donating colorless dyes and electron accepting organic developers. These materials include compounds which have been known as a component of heat-sensitive recording papers.

Typical examples of the electron donating colorless dyes are leuco dyes including triphenylmethane dyes such as crystal violet lactone, fluoran dyes such as 3-diethylamino-6-methyl-7-anilinofluoran, azaphthalide dyes such as 3-(4-diethylamino-2-ethoxyphenyl)-3-(1-ethyl-2-methylindol-3-yl)-4-azaphthalide and fluorene dyes such as 3,6,6'-tris(dimethylamino)spiro[fluorene-9,3-phthalide].

Exemplary electron accepting organic developers include bisphenol-A's, 4-hydroxybenzoic acid ester, 4-hydroxyphthalic acid diesters, phthalic acid monoesters, bis(hydroxyphenyl)phenyl sulfides, 4-hydroxyphenylaryl sulfones, 4-hydroxyphenylarylsulfonates, 1,3-di[2-hydroxyphenyl)-2-propyl]-benzenes, 4-hydroxybenzoyloxybenzoic acid ester and bisphenol sulfones. These organic compounds are fully disclosed in Japanese Patent Laid-Open Publication No. 187082 (1987).

The heat-sensitive color-developing layer can be prepared by using the material capable of developing color by itself or by reaction with other substances as conducted in the manufacture of conventional heat-sensitive recording papers. That is, a coating compound is usually obtained by adding quality regulators to the material capable of developing color by itself or by reaction with other substances, and applied on the substrate to prepare the color-developing layer. The quality regulators include binder, white pigment, sensitizer, image stabilizer and other agents for suitably adjusting properties such as slip of recording layer. Practical examples of the quality regulators which may be used are described in Japanese Patent Laid-Open No. 187082/1987 and other various known literatures on heat-sensitive recording paper.

In the present invention, the light absorbent which absorbs recording beams to carry out thermal conversion is not added directly to the heat-sensitive color-developing material. The present invention is characterized in that the above light absorbent is previously dispersed or dissolved in a solvent soluble or heat fusible material, followed by pulverizing, and then added to the heat-sensitive color-developing material to be used.

No particular restriction is placed upon the heat fusible material for use in this invention so long as said material has a melting point equivalent to or lower than that of the thermally color-developing material by itself or by reaction with other substances. That is, any quality regulators including dye, color developer, sensitizer, image stabilizer and other additives which are presently used in the field of heat-sensitive recording paper can be used so long as these regulators satisfy the above condition.

The sensitizer is particularly suitable among these quality regulators. The compounds illustrated below are preferred in particular, because these compounds are neutral, contain fewer functional groups, have a melting point lower than that of the thermally color-developing material in a fused state by itself or by reaction with other materials and can dissolve both the color developing material and the light absorbent.

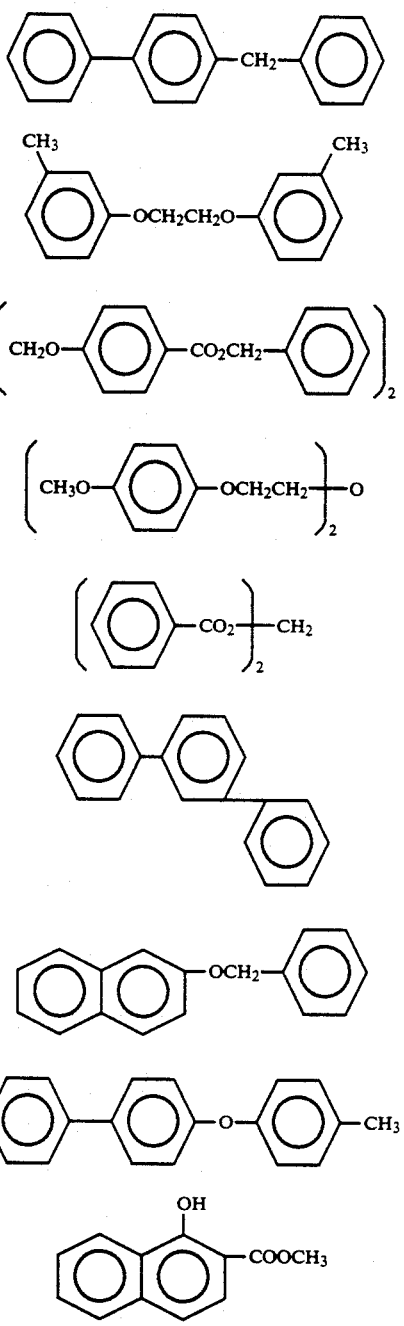

The heat fusible materials other than those illustrated above include, for example, fatty acid amides such as stearic acid amide and palmitic acid amide, ethylenebisamide, montan wax, polyethylene wax, dibenzyl terephthalate, benzyl p-benzyloxybenzoate, di-p-tricarbonate, p-benzylbiphenyl, phenyl-α-naphthylcarbonate, 1,4-diethoxynaphthalene, 1-hydroxy-2-naphthoic acid phenyl ester, and 1,2-di(3-methylphenoxy)ethylene.

These heat fusible materials can be used singly or in combination.

The heat fusible materials containing the light absorbent can be prepared by dissolving or dispersing the light absorbent in the heat fusible material in molten state, or by previously mixing the heat fusible material with the light absorbent and then heat-fusing the resulting mixture.

The solvent soluble material for use in this invention includes a material which is selected from the above heat fusible material and soluble in solvent, material capable of developing color by itself or by reaction with other substances, and the above heat-sensitive color-developing material, i.e., material having thermochromism which thermally develops color by itself, electron donating colorless dye and electron accepting developer. The solvent soluble material may also be selected from the image stabilizer and other quality regulators.

The preferred image stabilizer includes, for example, a metal salt of phthalic acid monoester, metal salt of p-tert-butylbenzoic acid and metal salt of p-nitrobenzoic acid.

Other quality regulators which may be preferably used include, for example, sticking inhibitors such as metal salt of fatty acid; pressure color development inhibitors such as fatty acid amide, ethylene bis-amide, montan wax, and polyethylene wax; dispersants such as sodium dioctylsulfosuccinate, sodium dodecylbenzenesulfonate, sodium laurate, sodium salt of laurylalcoholsulfate ester and alginic acid; ultraviolet absorbers such as benzophenone derivatives and triazole derivatives; known antifoaming agents which can be used for dyestuff base heat-sensitive recording papers; fluorescence whitening dyes; and waterproofing agents.

In the practice of this invention, the light absorbent dissolved or dispersed in the solvent soluble material or heat fusible material is prepared as follows: The light absorbent is added to the solution containing the above solvent soluble material or added to the solvent together with the solvent soluble material, thoroughly mixed to dissolve or disperse in the solvent and the solvent is removed. When the light absorbent is insoluble or difficulty soluble in the solvent, the absorbent is pulverized prior to use as such or in combination with a suitable dispersing agent by using a grinding machine such as a sand grinder or a dispersing machine. The particle size obtained after pulverization is the finer, the better, preferably 3 μm or less, more preferably 1 μm or less.

Next, the above obtained light absorbent which is dispersed or dissolved in the solvent soluble material or in the heat fusible material is wet ground as in the case of usual heat-sensitive materials by using a grinding machine or a dispersing machine such as an attritor, sand grinder or a ball mill. The light absorbent thus obtained has a particle size of usually 0.1 to 3 m and is uniformly mixed with other necessary components to obtain a coating liquid.

For example, when the solvent soluble material or the heat fusible material is a dye which thermally develops color by itself, the light absorbent is dissolved in the solvent together with the dye, dried to remove the solvent and pulverized. The mixture thus obtained is mixed with a binder, white pigment, sensitizer, and quality regulators to obtain the coating liquid.

When the solvent soluble or heat fusible material has a melting point lower than that of one or more of the heat-sensitive color-developing material, i.e., when the material is a so-called sensitizer, the light absorbent is uniformly mixed with the molten heat-fusible material, cooled and then pulverized. The resultant sensitizer containing the light absorbent is further mixed with the heat-sensitive material which develops color by itself or by reaction with other substances, binder, white pigment and quality regulators to prepare the coating liquid. In this case, the same sensitizer as that containing the light absorbent or other kind of sensitizer may be further added. When the molten sensitizer containing the light absorbent cannot sufficiently dissolve the heat-sensitive color-developing material, simultaneous use of other light absorbent which can dissolve, in the molten state, the heat-sensitive color-developing material is a favorable method.

When the solvent soluble material or the heat fusible material is one of the material which thermally develops color by reaction with other substances, for example, the electron accepting organic developer, the electron accepting organic developer and the light absorbent are dissolved in a solvent, mixed and dried to remove the solvent. Alternatively, the developer and the absorbent are fused by heating, mixed and cooled. The resultant electron accepting organic developer containing the light absorbent is pulverized and uniformly mixed with the electron donating colorless dye, binder, white pigment, sensitizer and quality regulators to obtain the coating liquid.

The preferred binders for use in the coating liquid include, for example, modified polyvinyl alcohols such as completely saponified polyvinyl alcohol having a polymerization degree of 200 to 1900 and amide modified polyvinyl alcohol, hydroxyethyl cellulose and styrene butadiene copolymer.

The white pigments which may be added are inorganic or organic fillers which are usually used in the field of paper processing and include, for example, clay, calcium carbonate, and plastic pigment. In particular, a hollow plastic pigment is preferred because of excellent reflection of light and good retention of heat. As to various materials for use in the heat-sensitive color-developing layer, the basic colorless dye, the organic developer, the binder, the sensitizer, the filler and the quality regulators which have been disclosed by the present inventors in Japanese Patent Application No. 272702/1988 may be similarly used in the present invention.

Kinds and amounts of the electron donating colorless dye, electron accepting acid material, binder, sensitizer, filler and other various components in the color developing layer used in the present invention are dependent upon a required performance and recording properties, and not affected by particular restriction. However, it is usually desirable that the electron accepting acid material is 3 to 12 parts, the sensitizer is 3 to 12 parts and the filler is 1 to 20 aprts based on 1 part of the electron donating colorless dye and the binder is 10 to 25 parts in the total solid of the color developing layer.

The coating liquid thus obtained is applied on the substrate with a coating machine such as a bar coater, air knife coater or blade coater which is generally used for paper coating to obtain the otpical recording medium. No particular limitation is imposed upon the substrate. However, a base paper obtained by mixing pulp substrate. However, a base paper obtained by mixing pulp with fiber, if necessary, is most generally used in view of readiness in coating with a water-base coating compound.

It is preferred to provide a protective layer for diminishing or preventing environmental contamination such as moisture, gases, water, solvents and oils.

The preferable protective layer is permeable to the visible light and recording light and does not give adverse effect on the heat-sensitive color-developing layer. Usually, one or more binders are selected from those used for the heat-sensitive color-developing layer and employed for the protective layer.

Alternatively, the protective layer may also contain a small amount of the light absorbent which is soluble in water or solvent and transmits visible light as much as possible. Furthermore, the underside of the heat-sensitive color-developing layer may also be equipped with a light absorbing layer containing the light absorbent which is dissolved or dispersed in the binder.

As mentioned above, when the light absorbent is used according to the present invention in the form of a dispersion or a solution in the solvent soluble or heat fusible material, an optical recording medium having high image density, good ground color and sufficient contrast for direct reading with naked eyes of human can be obtained. The reason is not clear, however, thought to depend upon the following facts:

(1) When the light absorbent is contained in the heat fusible material (sensitizer) having a melting point lower than that of the heat-sensitive color-developing material, the evolved heat from the light absorbent by absorbing the recording light immediately fuses the sensitizer around the light absorbent. The fused sensitizer dissolves and mixes with the surrounding heat-sensitive color-developing component to emerge color developing phenomenon. That is, application of sensitizer having light absorbing function accelerates fusing rate of the sensitizer which is the rate-determining step and thus enhances initiating step of color development.

(2) Since the light absorbent is located very close to the heat-sensitive color-developing component, energy converted from light to heat is rapidly and effectively transmitted. The process is restricted to the portion where light is absorbed and rapidly starts initiation step of color development, and results in high image density and good resolution.

(3) The light absorbent does not directly contact with the heat-sensitive color-developing component and is isolated in other colorless material. Consequently, characteristic coloring of the light absorbent is masked. In addition, the coating liquid obtained by mixing with other components such as the heat-sensitive color-developing components has a low level of coloring. Even after application of the coating liquid, disadvantages such as coloring and desensitization due to mutual reaction are difficult to occur. As a result, the ground color of the optical recording medium is improved and visual contrast of the image is enhanced.

EXAMPLE

The present invention will be illustrated with reference to the following examples. In the examples, parts and % are parts by weight and % by weight.

The optical recording media obtained in the following examples and comparative examples were evaluated by the below described methods on the coloring density of the recorded spots and the ground color. The results are illustrated in Table 1.

Density of the recorded image (colored spot):
Density was measured with a microdensitometer (made by Konishiroku Photo Industry Co., Ltd.; Model PDM-5). Measured value was converted to Macbeth density.

Grand color of the optical recording paper:
Ground color was measured with a Macbeth densitometer.

EXAMPLE 1

A dispersion of an electron donating colorless dye (liquid A), a dispersion of an electron accepting acid material (Liquid B) and a dispersion of a light absorbing sensitizer (Liquid C) having the following compositions, respectively, were separately wet ground for an hour with a sand grinder. Then, to a mixture 7.3 parts of Liquid (A), 30 parts of Liquid (B) and 20 parts of Liquid (C), 25 parts of 25% aqueous dispersion of white pigment silica (Mizukasil P-527; made by Mizusawa Kagaku Co., Ltd.) and 10 parts of 10% aqueous PVA solution were added and mixed to obtain a heat-sensitive color-developing coating Liquid which contains the light absorbent. The coating liquid thus obtained was applied on a wood free paper having a basis weight of 60 g/m$^2$ in an amount of 5 g/m$^2$ by using a meyer bar, followed by drying to obtain an optical recording medium.

Liquid (A): Electron donating-colorless dye dispersion

| | |
|---|---|
| Black color developing dye: ODB | 2.0 parts |
| 10% PVA aqueous solution | 3.4 parts |
| Water | 1.9 parts |
| Total | 7.3 parts |

ODB: 3-Diethylamino-6-methyl-7-anilinofluoran

Liquid (B): Electron accepting acid material dispersion

| | |
|---|---|
| Developer: BPA | 6.0 parts |
| 10% PVA aqeuous solution | 15.0 parts |
| Water | 9.0 parts |
| Total | 30.0 parts |

BPA: Bisphenol A

Liquid (C): Light absorbent containing material dispersion p-Benzylbiphenyl (PBB) which is a sensitizer of the heat-sensitive color-developing recording paper was used as a heat fusible material.

A near infrared absorbent NK-125 (made by Nippon Kankoshikiso Kenkyusho Co., Ltd.; Maximum absorption wave Length, 741 mµ) was used as a light absorbent.

To 49 parts of PBB, 1 part of NK-125 was added, heated to 100°–150° C. and mixed in the molten state. The resulting mixture was cooled and pulverized to an average particle diameter of 1.5 µm by using a sand grinder to give a light absorbent containing material. Liquid (C) has the following composition:

| | |
|---|---|
| The above light absorbent containing material | 4.0 parts |
| 10% PVA aqueous solution | 10.0 parts |
| Water | 6.0 parts |
| Total | 20.0 parts |

The optical recording medium thus prepared was irradiated with laser beams by the use of a device shown in FIG. 1 in which a semiconductor laser head (laser diode collimeter head LDC-8330-CINC: made by Applied Optic Co., Ltdf., central wave length 830 nm, output 30 mW) was combined with a condenser (made by Olympus Optical Co., Ltd., MDPLAN 5, 0.1) in order to carry out optical printing. In this case, irradiation was carried out for 1/500 second.

In FIG. 1, 1 is laser diode collimeter head, 2 is shutter, 3 is condenser group, 4 is optical recording paper, and 5 is power source.

EXAMPLE 2

An optical recording medium was prepared by conducting the same procedures as described in Example 1 except that the light absorbent containing material of Example 1 was prepared by using 0.5 part of the near infrared absorbent NK-125 and 49.5 parts of sensitizer p-benzyl biphenyl.

EXAMPLE 3

An optical recording medium was prepared by conducting the same procedures as described in Example 1 except that 0.5 parts of the near infrared absorbent NK-125 was used and p-benzyl biphenyl was replaced by 49.5 parts of sensitizer MPE having the below described formula.

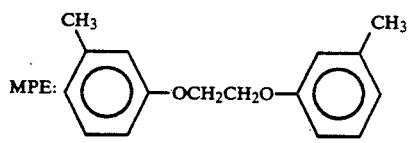

EXAMPLE 4

The light absorbent containing material described in Example 1 was prepared by adding 1 part of the near infrared absorbent NK-125 and 9 parts of p-benzyl biphenyl to 300 parts of acetone, stirring to give a homogeneous solution, removing acetone by distillation under reduced pressure, and pulverized with a ball mill into a particle size of about 1 µm.

Using 4 parts of the light absorbent containing material thus obtained, a dispersion of the material was prepared by the same procedures as described in Liquid (C) of Example 1. An optical recording medium was obtained by carrying out the same procedures as described in Example 1.

EXAMPLE 5-9

Optical recording media were prepared by carrying out the same procedures as described in Example 1 except that kinds and amounts of the light absorbent employed were changed as illustrated in Table 1.

In Table 1, abbreviations of agents are as follows except those described in Example 1.

Dye: Electron donating colorless dye
Developer: Electron accepting acid material
Sensitizer: Heat fusible material.

Dye

ODB-2: Dibutylamino-6-methyl-7-anilinofluoran
S-205: 3-(N-ethyl-N-isoamyl)-6-methyl-7-anilinofluoran.

Developer

POB: Benzyl p-hydroxybenzoate.

Sensitizer

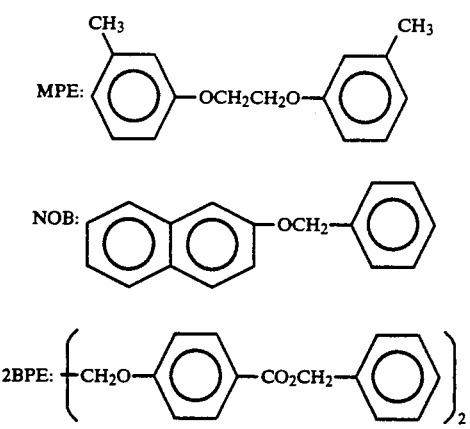

The symbol (') on the name of an agent indicates that the agent was used in the form containing the light absorbent.

Light absorbent

NK-123: Near infrared absorbent made by Nippon Kanko shikiso Kenkyusho Co., Ltd. Maximum absorption wave length 817 mμ.

NK-2268: Near infrared absorbent made by Nippon Kanko Shikiso Kenkyusho Co., Ltd. Maximum absorption wave length 831 mμ.

NK-2014: Near infrared absorbent made by Nippon Kanko shikiso Kenkyusho Co., Ltd. Maximum absorption wave length 778 mμ.

ICIS 116510/2: Near infrared absorbent made by ICI in England. Maximum absorption wave length 770 mμ.

It is clearly understood from Table 1 that the optical recording medium prepared by using the light absorbent which is previously dispersed in the heat fusible material (sensitizer) can exhibit sufficient density of record with a very small amount of the light absorbent.

Comparative examples will hereinafter be illustrated as reference.

COMPARATIVE EXAMPLES 1 AND 2

Optical recording media were prepared by conducting the same procedures as described in Example 1 except that the light absorbent was omitted in the preparation of Liquid (C) in Example 1 and the light absorbent containing material was replaced with the same amount of the heat fusible material (sensitizer) used in Examples 1 and 3. Results on quality evaluation are summarized in Table 1.

These Comparative Examples indicate the cases for using conventional heat-sensitive recording papers as the optical recording media. As clearly shown in Table 1, the heat-sensitive recording papers containing no light absorbent do not develop color at all by the irradiation of light.

COMPARATIVE EXAMPLE 3

The light absorbent was not dispersed in the heat-fusible material in advance. The light absorbent and the heat fusible material (sensitizer) were separately mixed as intact with the heat-sensitive color-developing dispersion.

Liquid (C-1) having the following composition was prepared by using the near infrared absorbent ICIS 116510/2 of ICI as the light absorbent which was used in Examples 5 and 7.

Liquid (C-2) having the following composition was prepared by using PBB of Example 1 as the sensitizer.

| Liquid (C-1): Light absorbent dispersion | |
|---|---|
| Light absorbent | 1 part |
| Water | 19 parts |
| Total | 20 parts |

Dispersion was obtained by violent stirring with a stirrer.

| Liquid (C-2): Sensitizer dispersion | |
|---|---|
| Sensitizer | 4 parts |
| 10% PVA aqueous solution | 10 parts |
| water | 6 parts |
| Total | 20 parts |

Dispersion was obtained by violent stirring with a stirrer.

An optical recording medium was prepared by conducting the same procedures as described in Example 1 except that 0.8 part of Liquid (C-1) and 20 parts of Liquid (C-2) were added in place of Liquid C of Example 1. The amount of the light absorbent used was 1% of the sensitizer PBB.

Results on the recording evaluation are illustrated in Table 1.

The amounts of the light absorbent and the sensitizer used in the comparative example are almost the same as in Examples. However, as clearly shown in Table 1, both the ground color and the developed color density of the comparative example are inferior to those of examples.

COMPARATIVE EXAMPLE 4

The light absorbent was placed on the underside of the heat-sensitive color-developing layer.

A light absorbent dispersion obtained by using the near infrared absorbent NK-125 as in Example 1 was applied on a wood free paper used in Example 1 in an amount of 0.1 g/m² (as solid) to provide a light absorbing layer. On the light absorbing layer thus obtained, a heat-sensitive color-developing layer was formed by applying an amount of 5 g/m² of the sensitizer dispersion which was the same as used in Comparative Example 1. The optical recording medium thus obtained was evaluated by the same method as in Example 1. The amount of the light absorbent applied was equivalent to 0.05 g/m² in this comparative example and 0.02 g/m² in Example 1. That is, this comparative example used 2.5 times in the amount of the light absorbent as compared with Example 1. However, as clearly understood from Table 1, the ground color and the density of developed color are much inferior to those of Example 1.

COMPARATIVE EXAMPLE 5

The light absorbent was placed on the surface of the heat-sensitive color-developing layer.

The light absorbent dispersion of Comparative Example 4 was applied on the surface of the optical recording medium prepared in Comparative Example 1 in an amount of 0.1 g/m². The resulting optical recording medium having a light absorbing layer on the heat-sensitive color-developing layer was evaluated by the same method as in Example 1. This comparative example used greater amount of the light absorbent than Example 1. However, the density of color development is much inferior to that of Example 1, as clearly shown in Table 1.

Now, examples of the present invention will be further illustrated.

EXAMPLE 10

Developer POB (benzyl p-hydroxybenzoate) used in Example 7 was employed for the heat fusible material. To 49.75 parts of POB, 0.25 part of the near infrared absorbent NK-125 which was used in Example 1 was added, fused at about 120° C. to give a homogeneous mixture, cooled and pulverized by an attritor into an average particle diameter of 0.9 μm. To 4 parts of the light absorbent containing material thus obtained, 10 parts of 10% PVA aqueous solution and 6 parts of water were added. The resulting mixture was wet ground for one hour with a sand grinder to obtain a light absorbent containing developer dispersion.

To 20 parts of the light absorbent containing developer dispersion thus obtained, 7.3 parts of liquid (A) in Example 1, 25 parts of 25% silica dispersion, and 10 parts of 10% PVA aqueous solution were added and mixed to obtain a heat-sensitive color-developing liquid which contains the light absorbent. The coating liquid thus obtained was applied on a wood free paper having a basis weight of 60 g/m² in an amount of 5 g/m² with a meyer bar and dried to obtain an optical recording medium.

The optical recording medium thus obtained was irradiated with laser beams by using a device shown in FIG. 1 in which a semiconductor laser head (laser diode collimetor head LDC-8330-CINC; made by Applied Optic Co., Ltd., central wave length 830 nm, output 30 mW) was combiend with a condenser having a numerical aperture of 0.28. Optical printing was carried out at a transfer rate of 1.5 mm/sec by using a rotary stage to obtain a black circular line record. As illustrated in Table 1, the optical recording medium was excellent in the density of recorded image and the ground color and had a good contrast.

EXAMPLE 11

A 5% solution of a near infrared absorbent was obtained by dissolving 1 part of a water-soluble near infrared absorbent, ICI 116510 (made by ICI, maximum absorption wave Length 765 mμ), in 19 parts of 10% PVA aqueous solution. The solution of a near infrared absorbent thus obtained was applied on the surface of the optical recording medium prepared in Example 1 in an amount of 1 g/m² with a meyer bar to provide a light absorbing and protective layer. Thus an optical recording medium containing light absorbent NK-125 in the heat-sensitive color-developing layer and light absorbent ICI 116510 in the protective layer was obtained.

The optical recording medium thus obtained was evaluated with a recording device used in Example 10. As illustrated in Table 1, the medium provided an image having an extremely high density. In addition, the medium had a faster rate of initiation in the color development to recording light.

TABLE 1

| | Heat sensitive material | | | Light absorbing material | | Evaluation | |
|---|---|---|---|---|---|---|---|
| | Dye | Developer | Sensitizer | Kind | Addition ratio | Color density | Ground color |
| Example | | | | | | | |
| 1 | ODB | BPA | PBB' | NK-125' | 2% | 1.40 | 0.18 |
| 2 | ODB | BPA | PBB' | NK-125' | 1% | 1.38 | 0.12 |
| 3 | ODB | BPA | MPE' | NK-125' | 1% | 1.37 | 0.11 |
| 4 | ODB | BPA | PBB' | NK-125' | 2% | 1.36 | 0.16 |
| 5 | ODB-2 | BPA | NOB' | ICIS116510/2' | 1% | 1.35 | 0.14 |
| 6 | S-205 | BPA | 2BPE' | NK-2104' | 1% | 1.42 | 0.11 |
| 7 | ODB | POB | 2BPE' | ICIS116510/2' | 1% | 1.35 | 0.15 |
| 8 | ODB | BPA | NOB' | NK-123' | 1% | 1.35 | 0.13 |
| 9 | S-205 | BPA | MPE' | NK-123' | 5% | 1.42 | 0.19 |
| 10 | ODB | POB' | — | NK-125 | 0.5% | 1.40 | 0.10 |
| 11 | ODB | BPA | PBB' | NK-125' (ICIS116510) | 2% | 1.43 | 0.20 |
| Comparative Example | | | | | | | |
| 1 | ODB | BPA | PBB | — | — | 0.06 | 0.06 |
| 2 | ODB | BPA | MPE | — | — | 0.06 | 0.06 |
| 3 | ODB | BPA | PBB | (ICIS116510/2) | — | 0.89 | 0.36*1 |
| 4 | ODB | BPA | PBB | (NK-125) | — | 0.83 | 0.25*2 |
| 5 | ODB | BPA | PBB | (NK-125) | — | 0.73 | 0.23*3 |

Note:
*1 Light absorbent is in the heat sensitive layer (simply mixed).
*2 Light absorbent is under the heat sensitive layer.
*3 Light absorbent is on the heat sensitive layer.

What is claimed is:

1. An optical recording medium having, on a substrate, a color-developing layer comprising:
   particles containing color-developing materials capable of developing color by thermal reaction with each other and a light absorbent capable of emitting heat by absorption of light being dissolved or dispersed in either a solvent soluble material or a heat fusible material.

2. The optical recording medium according to claim 1 wherein the light absorbent is a near infrared absorbent.

3. The optical recording medium according to claim 1 or claim 2 wherein the color-developing materials are an electron donating colorless dye and an electron accepting acid material.

4. The optical recording medium according to claim 3 wherein the electron accepting acid material is an electron accepting organic acid material.

5. An optical recording medium having, on a substrate, a color-developing layer comprising:

particles containing color-developing materials capable of developing color by thermal reaction with each other;

second particles containing a heat fusible material capable of accelerating the color-developing reaction; and a light absorbent capable of emitting heat by absorption of light being dissolved or dispersed the heat fusible material.

6. The optical recording medium according to claim 5 wherein the heat fusible material has a melting point lower than that of the color-developing materials.

7. The optical recording medium according to claim 5, wherein the light absorbent is a near infrared absorbent.

8. The optical recording medium according to claim 5, wherein the color-developing materials are an electron donating colorless dye and an electron accepting acid material.

9. The optical recording medium according to claim 8, wherein the electron accepting acid materials is an electron accepting organic acid material.

* * * * *